United States Patent [19]

Linn, Jr.

[11] 4,163,941

[45] Aug. 7, 1979

[54] VIDEO SPEED ANALYZER OF GOLF CLUB SWING OR THE LIKE

[76] Inventor: Roy N. Linn, Jr., 4 Laurel Dr., Danville, Ill. 61832

[21] Appl. No.: 846,801

[22] Filed: Oct. 31, 1977

[51] Int. Cl.$^2$ ............................................. G01P 3/68
[52] U.S. Cl. ................................. 324/178; 324/183; 273/DIG. 28; 273/186 R; 35/29 A; 358/22; 364/410; 364/565
[58] Field of Search ..................... 324/160, 183, 178; 35/29 A; 358/21, 903, 105, 22; 364/565, 410, 514, 551, 561; 273/186 R, 186 A

[56] References Cited

U.S. PATENT DOCUMENTS

| | | | |
|---|---|---|---|
| 3,890,462 | 5/1975 | Limb et al. | 358/105 |
| 4,064,528 | 12/1977 | Bowerman | 358/93 |

OTHER PUBLICATIONS

*IEEE Transactions on Communications*, vol. Com-23, No. 4, pp. 474–478, Apr. 1975, Limb et al., "Measuring the Speed of Moving Objects from Television Signals."

*Primary Examiner*—Robert J. Corcoran
*Assistant Examiner*—Walter E. Snow
*Attorney, Agent, or Firm*—Silverman, Cass & Singer, Ltd.

[57] ABSTRACT

A video device and method for analyzing golf club swings or the like includes means for detecting the golf club swing and calculating the resultant velocity of the club head. The velocity is then displayed on a display device in either a digital or analog mode. The golf club swing can then be analyzed by comparing the relative velocities during different club swings.

13 Claims, 6 Drawing Figures

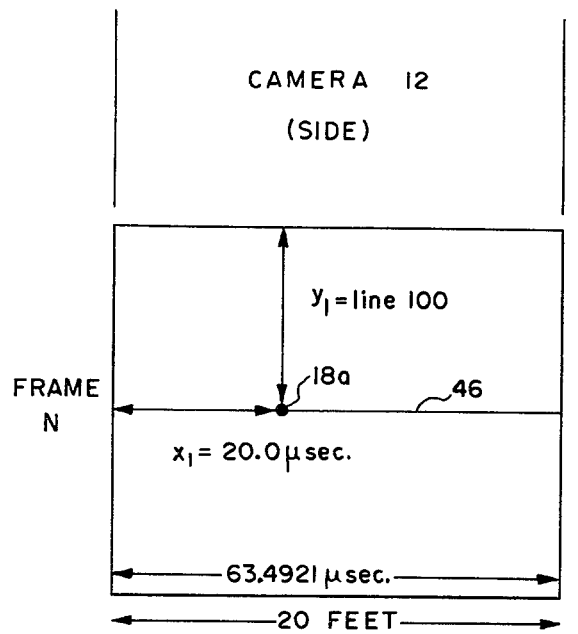
FIG. 3a
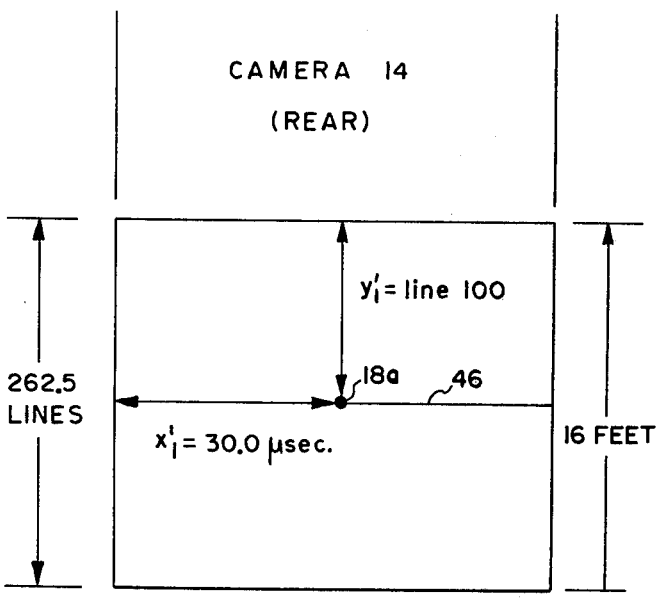
FIG. 3c
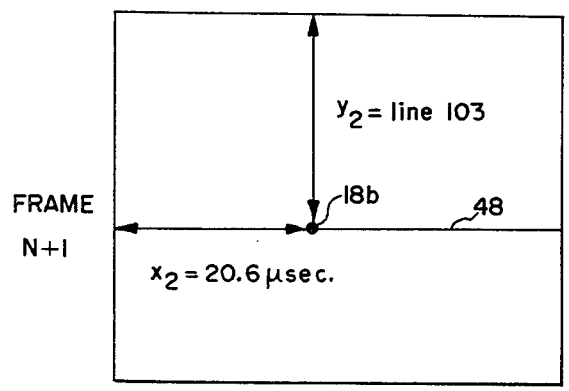
FIG. 3b
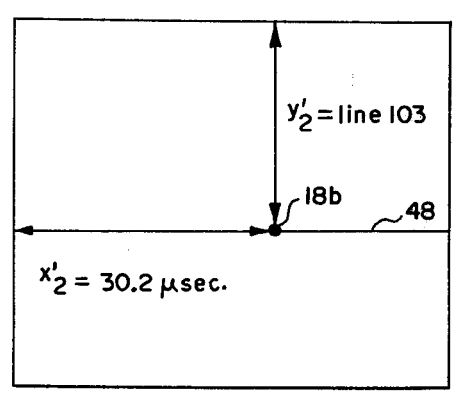
FIG. 3d
FIG. 3

VIDEO SPEED ANALYZER OF GOLF CLUB SWING OR THE LIKE

FIELD AND BACKGROUND OF THE INVENTION

This invention relates to a device and method for analyzing a golf club swing or the like. More particularly, this invention relates to a method for analyzing a golf club swing by detecting the velocity of the golf club head and comparing the resultant velocity to those of previous club swings or those of professional golfers.

Persons interested in learning the game of golf are generally taught by having the novice golfer observe the movements of a professional golfer and then trying to imitate them. The professional then coaches and corrects the novice's swing, stroke, stance, grip, etc.

This teaching method is time-consuming, difficult and expensive. In order for the novice actually to observe the professional or his own technique, it is necessary for the professional golfer either to be physically present or to have film or television playback equipment to display a recorded image.

As in such sports as baseball and tennis, the general objective in golf is to strike a small ball and impart a velocity to obtain accurate displacement of the ball. The additional objection of a golfer is in many instances to strike the ball so as to impart the maximum velocity and distance possible. Thus, the golfer endeavors to effect a swing which will achieve the maximum velocity. The key to such endeavors is for the golfer or professional to analyze the golfer's technique and correct the deficiencies, if any.

Various devices not embodying the present invention have been proposed heretofore to analyze golf swings. Generally these devices have been of a photographic or television nature.

McCullough, et al., U.S. Pat. No. 3,408,750 has proposed a method of providing golf instruction by using dual television cameras at right angles, dual video playback means and dual video recording means. The student watches a pair of television monitors that display the prerecorded front and side images of a professional golfer. The student simultaneously attempts to imitate the professional's form while video recording means record his own form and technique. The recorded images of the student are then replayed for analysis by a professional teacher.

Adorney, et al., in U.S. Pat. No. 3,820,133 proposes an alternative method to analyze golf swings. A novice golfer performs his golf swing in an enclosed stall having a still camera actuated by a plurality of electric eyes record his swing. During the motion of the golf swing, the electric eyes actuate the still camera, causing photographs to be taken during various phases of motion of the golfer's swing. The resultant photographs are then analyzed by a teacher to show the student the deficiencies, if any, in his form.

There are several disadvantages present in the previously cited methods. Both McCullough and Adorney utilize the technique of recording images of the student's form and analyzing this form in comparison with that of a professional golfer. While a student may imitate the professional's form adequately, he has no objective indication that he is achieving any progress in improving his golf game. He must rely totally on the subjective analysis by his instructor. Such analysis will vary because of it subjective nature.

SUMMARY OF THE INVENTION

The invention provides an objective measure by which to analyze one of the principal criteria of a golf club swing, namely, the golf club head velocity. A pair of television cameras, rendered responsive to a single color, are focused at right angles to a golfer swinging a golf club with a single color head. Color responsive and scanning circuitry within each camera scan a field of view for single color images corresponding to the colored golf club head and corresponding pulses are generated.

These corresponding pulses from both cameras are transmitted with synchronizing information generated by a sync generator to logic means. Logic means, being responsive to the displacement of pulses received during repeated scanning intervals, calculate the displacement of said pulses and the velocity of said pulses which corresponds to the velocity of the golf club head in each plane viewed by a camera. A numerical value or analog signal corresponding to the velocity is displayed on a display means.

In this manner the golfer can have an objective measurement of the progress of his lessons. If he improves his swing, the velocity of the club head as determined by the invention will increase until a maximum velocity is achieved.

The present invention is not limited to analyzing golf club swings, but may be employed to analyze the racket or bat movement of such other sports as tennis, racquet ball or baseball, where the participant seeks to swing a bat or racket to impart a maximum velocity to a ball. The invention may also be used in various industrial applications to measure the displacement and velocity of a moving object.

BRIEF DESCRIPTION OF THE DRAWINGS

FIGS. 3a, 3b, 3c and 3d comprise graphic representations of the displacement of a pulse in a field of view corresponding to the displacement of a golf club head.

DESCRIPTION OF THE PREFERRED EMBODIMENT

Figure 1:
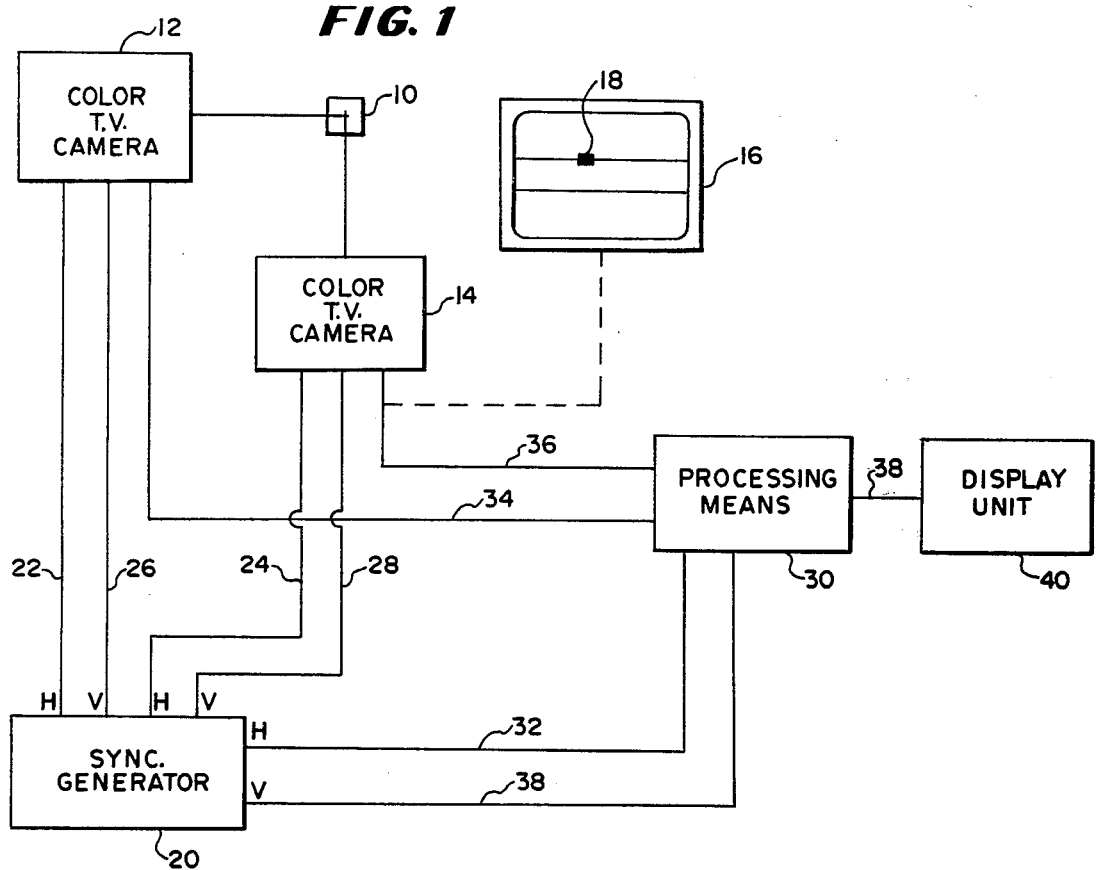
FIG. 1 is a block diagram of a system for analyzing golf swings embodying the present invention.

Referring to FIG. 1, there is shown in block form a device for analyzing a golf club swing including a single colored golf club head, two television cameras, synchronizing means, processing means and a display unit.

A student golfer holding a golf club having a head colored with a single color shown at 10 is positioned between cameras shown 12 and 14 and these cameras are focused on club head 10. The two cameras 12 and 14 are positioned at right angles to each other so as to receive the front and side images of the club head 10. Each camera is rendered responsive to a single color, the particular color of the golf club head 10. These cameras are typically closed circuit color television cameras of the type generally available which have been adjusted to respond only to a single color.

Each camera includes video circuits that generate repeated scanning lines and circuits that detect single colored images corresponding to the colored golf club head 10 that are received during each scanning interval. Upon detection of such single colored images, video circuits responsive to such images produce a pulse corresponding to each single colored image.

Figure 2:
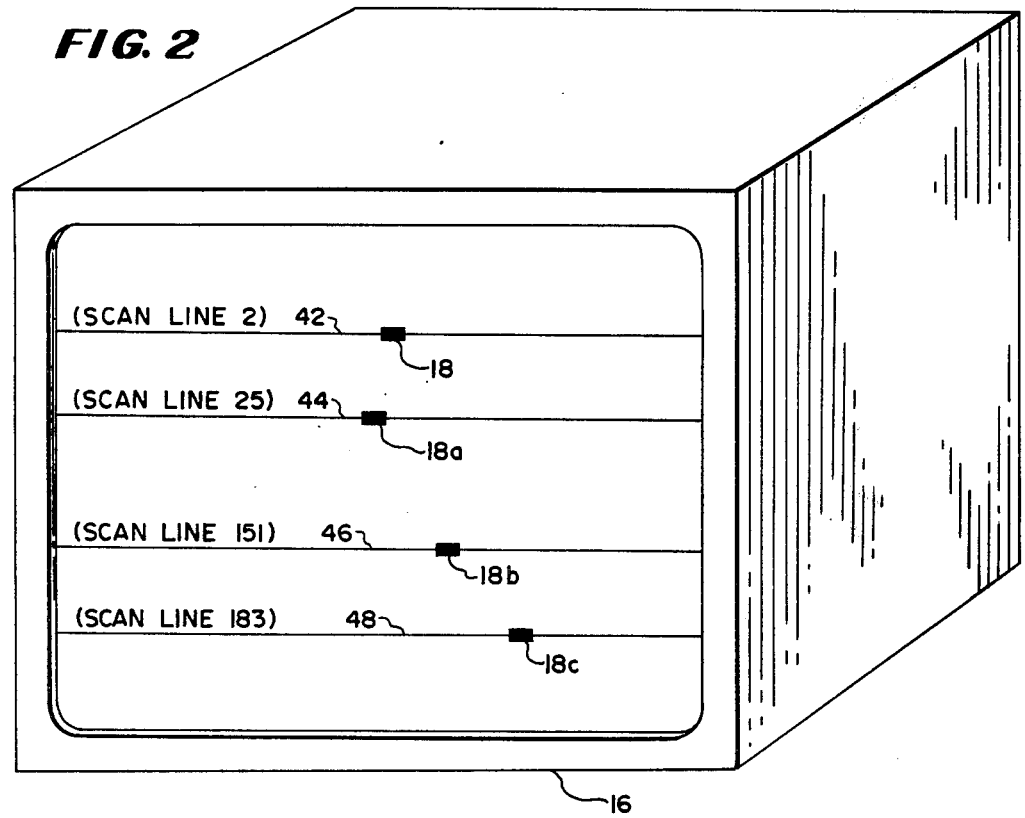
FIG. 2 is a drawing of a video display showing the displacement of pulses during repeated scanning intervals.

FIG. 2 illustrates a drawing of the screen of a video monitor 16 displaying pulses 18, 18a, 18b and 18c corresponding to the images of a golf club head 10 carrying one color during repeated scanning intervals.

Synchronizing means shown at 20 generate synchronizing information comprised of horizontal and vertical sweep triggering pulses and transmit these horizontal and vertical pulses to cameras 12 and 14 along horizontal pulse lines 22 and 24 and vertical pulse lines 26 and 28, respectively. The horizontal pulses are generated at a horizontal sweep rate of 15,750 hertz. The vertical pulses are generated at a rate corresponding to one pulse for every 262.5 lines. Synchronizing means 20 typically comprise a closed circuit video sync commercially available.

Processing means shown at 30 are interconnected to synchronizing means 20 and receive synchronizing information along horizontal pulse information line 32 and vertical pulse information line 33. Processing means 30 also receive video information from cameras 12 and 14 along lines 34 and 36, respectively.

Processing means 30 include a fixed logic program for determining the displacement of pulses generated by cameras 12 and 14 which pulses correspond to the images of the club head 10 that each camera receives.

From the determination of the displacement of pulses and synchronizing information corresponding to the scanning interval, the fixed logic program calculates the velocity of the pulses, which corresponds to the velocity of the club head 10 in each plane. Typically processing means 30 include a microprocessor and associated peripheral hardware such as a commercially available Radio Shack TRS-80 Microcomputer.

A signal corresponding to the resultant velocity of the club head in each plane is transmitted along line 38 to display unit 40. This signal will be transmitted either in analog or digital mode depending on the type of display unit selected. Typically, display unit 36 includes a strip chart recorder.

To use the device, the golfer, gripping the gold club, is placed in the intersecting planes of cameras 12 and 14. The golf club head 10 is colored red, for example, if the cameras have been adjusted to respond to primarily that color. Suitable optical filters may be interposed between the camera lenses and the object to enhance the single desired color.

Video circuits within each camera generate scanning lines represented by lines 42, 44, 46 and 48 for scanning the field of view. If an object of the particular color chosen such as a colored golf club head 10 is detected during the scanning interval, a video pulse 18 is generated corresponding to the image of such single colored object within each camera.

If the club head 10 is displaced within the field of view of cameras 12 and 14, the respective corresponding pulse 18 generated by each camera will be similarly displaced. This is illustrated in FIG. 2 where pulse 18a generated during scan line 25 as shown by line 44 is displaced from pulse 18 generated during scan line 1 as shown by line 42.

Pulses generated by camera 12 and 14 together are transmitted to processing means 30 along lines 34 and 36, respectively. Processing means 30 also receive synchronizing information comprised of horizontal and vertical pulses along lines 32 and 33 from synchronizing means 20. From the pulse and synchronizing information so received, the processing means transform the pulse data received from camera 12 and 14 into a respective cartesian coordinate system for each plane in timed relation to the synchronizing pulses. Each pulse is then assigned a specific X,Y coordinate. The X coordinate being the time elapsed after the beginning of a horizontal sweep and the Y coordinate being the number of scan lines after the beginning of a new frame. For example, the X and Y coordinates of pulse 18a, shown in FIG. 3a are respectively 20,000 microseconds and 100 scan lines. Displacement of each pulse is determined by reference to the change in the respective X and Y coordinates of the pulse during repeated scanning intervals.

Processing means 30 then calculate the velocity of pulse 18, having previously determined the pulse displacement, by reference to the time interval between scanning lines. The resultant velocity of each pulse corresponds exactly to the velocity of the colored images of the golf club head 10 in each plane. A signal representing the value of the velocity of the pulse is transmitted to a display unit.

A sample calculation as performed in processing means 30 from data corresponding to the pulse displacement as shown in FIGS. 3a, b, c and d is illustrative of this method. Each television camera being directed on the golfer gripping the colored golf club head 10, will detect images in a 16'×20' field of view and generate pulses corresponding to such images.

The relative position of the pulses within the cartesian coordinate system developed within processing means 30 may be referenced to the actual position of the images of the club head 10 within the 16'×20' field of view by suitable X and Y dimensional multipliers. The X dimension multiplier $K_2$ can be calculated as follows:

$$K_2 = Xd/Xt \qquad (1)$$

where:

$K_2$ = is the X dimensional multiplier in feet/sec.

$Xd$ = is the X dimension field of view distance observed by the camera in feet.

$Xt$ = is the time interval during horizontal scanning.

An example of the application of this formula is given below when $Xd = 20'$ and $Xt$ the time interval during horizontal scanning is the reciprocal of 15,750 hertz.

$$K_2 = 20 \cdot 15,750 = 315,000 \text{ feet/usec} \qquad (2)$$

In the same manner, $K_1$ the Y coordinate multiplier may be calculated.

$$K_1 = Yd/Yt \qquad (3)$$

where:

$K_1$ is the Y coordinate multiplier in feet/scan line $Yd$ = Y dimension of the field of view distance $Yt$ = total number of scan lines per time interval.

An example of the application formula is given below where $Yd = 16'$ and the $Yt = 252.5$ scan lines/sec.

$$K_1 = \frac{16'}{252.5} \text{ scan lines/sec.} \qquad (4)$$
$$= .060952381 \text{ feet/scan line}$$

By use of the previously calculated $K_1$ and $K_2$ coordinate multipliers, the displacement of the single color images cooresponding to the displacement of the pulses 18a and 18b, as shown in FIG. 3, is determined.

The general formula for determining displacement between two cartesian coordinates is given by $$D = \sqrt{(X_1 - X_2)^2 + (Y_1 - Y_2)^2} \qquad (5)$$

where D is the total displacement between coordinates $(X_1 - X_2)$ being the displacement between coordinates $X_1$ and $X_2$, respectively, and $(Y_1 - Y_2)$ being the displacement between coordinates $Y_1$ and $Y_2$, respectively.

An application of this formula for the data illustrated in FIGS. 3a and 3b corresponding to the displacement of a single colored image in the field of view scanned by camera 12 is given below where $(X_1 - X_2)$ equals 0.600 user and where $(Y_1 - Y_2) = 3$ scan lines. Applying the previously calculated multipliers $K_1$ and $K_2$ to reference the pulse displacement to the displacement of the image of the colored golf club head 10 in the 16'×20' field of view, the displacement of the colored image of the golf club head 10 becomes $$D_1 = \sqrt{[K_2(X_1 - X_2)]^2 + [K_1(Y_1 - Y_2)]^2} \qquad (6)$$

where:
$D_1$ = the displacement of the single color image of the colored golf club head 10 in the field of view scanned by camera 12.
$K_1$ being the Y coordinate multiplier
$K_2$ being the X coordinate multiplier
$(X_1 - X_2)$ being the X coordinate displacement of the pulse
$(Y_1 - Y_2)$ being the Y coordinate displacement of the pulse
$D_1$ becomes $$D_1 = \sqrt{[315,000 \ (0.6 \ \text{usec})]^2 + [0.060952381(3)]^2} \qquad (7)$$

$$D_1 = 0.2629785823 \qquad (8)$$

The elapsed time of the displacement of the image of colored club head 10 from first X,Y coordinates in the first frame to second X,Y coordinates in a succeeding frame may be computed by reference to the general formula $$T = 262.5 \cdot A - Y_1 \cdot A - X_1 + Y_2 \cdot A + X_2 \qquad (9)$$

where:
T = the elapsed time of displacement of the image of colored club head 10 between a first frame and a succeeding frame,
A being the time period for one scan line = 63.4921 usec,
2625·A being the time interval for one complete field = 16,666.6667 usec,
$X_1$ being the X coordinate of the image of club head 10 in the first frame,
$X_2$ being the X coordinate of the image of colored club head 10 in the succeeding frame,
$Y_1$ being the Y coordinate of the image of the colored club head 10 in the first frame,
$Y_2$ being the Y coordinate of the image of the colored club head 10 in the succeeding frame.

$T_1$, the elapsed time of the displacement of the image of the colored club head 10 in the field of view scanned by camera 12 now becomes $$T_1 = 262.5 \cdot 63.4921 \ \text{usec} - 100 \cdot 63.4921 - 20.0 \ \text{usec} + 103 \cdot 63.4921 \ \text{usec} + 20.6 \ \text{usec}. \qquad (10)$$

$$T_1 = 0.0168577429 \ \text{sec} \qquad (11)$$

The displacement, $D_2$, of the image of the single colored club head 10 in the field of view of scanned by camera 14 may be calculated from the sample data shown in FIGS. 3c and 3d in a similar manner by use of Formula 6.
$D_2$ becomes $$D_2 = \sqrt{[K_2(X_1 - X_2)]^2 + [K_1(Y_1 - Y_2)]^2} \qquad (12)$$

where:
$D_2$ = displacement of the single color image of the colored golf club head 10 in the field of view scanned by camera 14,
$K_1$ being the Y coordinate multiplier,
$K_2$ being the X coordinate multiplier,
$(X_1 - X_2)$ being the X coordinate displacement of the image of the single colored golf club head 10 in the field of view scanned by camera 14.
$(Y_1 - Y_2)$ being the Y coordinate displacement of the image of the single colored golf club head 10 in the field of view scanned by camera 14.
$D_2$ becomes $$D_2 = \sqrt{[315,000(0.2 \ \text{usec})]^2 + [0.060952381(3)]^2} \qquad (13)$$

$$D_2 = 0.1934056233 \ \text{feet}. \qquad (14)$$

Using the previously developed formula (9) for time elapsed during the displacement of the image of single colored club head 10, $T_2$, the elapsed time interval during displacement of the image in the field of view scanned by camera 14 now becomes $$T_2 = 262.5 \cdot 63.4921 \ \text{usec} - 100 \cdot 63.4921 \ \text{usec} - 30.0 \ \text{usec} + 103 \cdot 63.4921 \ \text{usec} + 30.2 \ \text{usec} \qquad (15)$$

$$T_2 = 0.0168573429 \ \text{seconds} \qquad (16)$$

The total combined displacement, $D_T$, of the image in the fields of view of cameras 12 and 14 may be calculated by reference to the general formula, $$D_T = \sqrt{(D_1)^2 + D_2)^2} \qquad (17)$$

where:
$D_T$ = the total combined displacement of the image of colored club head 10 in the fields of view of cameras 12 and 14,
$D_1$ being displacement of the image of colored club head 10 in the field of view scanned by camera 12.
$D_2$ being the displacement of the image of the colored club head 10 in the field of view scanned by camera 14.
$D_T$ becomes $$D_T = \sqrt{(0.2629785823)^2 + (0.194056233)^2} \qquad (18)$$

$$D_T = 0.3264406064 \ \text{feet}. \qquad (19)$$

Similarly the total combined time interval elapsed between the displacement of the images in the respective fields of view scanned by cameras 12 and 14 may be calculated by reference to the general formula.

$$T_T = \sqrt{(T_1)^2 + (T_2)^2} \tag{20}$$

where:

$T_T$ = the total combined time interval elapsed between the displacement of the images of the single colored golf club head 10 in the respective fields of view of cameras 12 and 14 respectively, $T_1$ being the time interval between the displacement of the image of the single colored golf club head 10 in the field of view scanned by camera 12, $T_2$ being the time interval between displacement of the image of the single colored golf club head 10 in the field of view scanned by camera 14.

$T_1$ now becomes $$T_T = \sqrt{(0.0168573429)^2 + (0.0168577429)^2} \tag{21}$$

$$T_T = 0.0238401658 \text{ sec.} \tag{22}$$

Having calculated the total combined displacement $D_T$ of the image of the colored golf club head 10 and the total combined time interval $T_T$ elapsed during such displacement, the velocity V corresponding to velocity the image of the colored golf club head 10 may be calculated by reference to the general formula $$V = D_T/T_T \tag{23}$$

where:

V = the velocity corresponding to the image of the single colored golf club head 10, $D_T$ is the total combined displacement of the images of the single colored golf club head 10 in the fields of view scanned by cameras 12 and 14, respectively, and $T_T$ being the total time elapsed during the displacement of the image of the single colored golf club head 10 in the fields of view scanned by cameras 12 and 14, respectively.

V now becomes $$V = 0.3264406064 \text{ feet}/0.0238401658 \text{ sec} \tag{24}$$

$$V = 13.6928823 \text{ feet/sec.} \tag{25}$$

It is believed that the invention in all of its phases has been fully described and it is desired to point out that the scope of this invention is believed to encompass many variations. These variations comprise the use of one or more cameras, and the readout of calculated velocity from each camera. It is therefore desired that the only limitations to the same be as set forth in the claims hereto appended.

What is desired to secure by Letters Patent of the United States is:

1. A method for measuring the velocity of an object such as the head of a swinging golf club moving within a field of view which comprises:
    A. coloring the object a single predetermined color;
    B. providing a television camera with scanning and color responsive video circuitry responsive primarily to said predetermined color;
    C. directing the camera to said field of view;
    D. scanning the image of the object and converting the resulting signals of the image of said object into pulses;
    E. Synthesizing an array of scanned lines and transforming said pulses onto said lines in timed relation to the generation of said lines;
    F. computing the pulse displacement when the pulse is displaced between repeated scanning lines on said array with due regard to the time interval between the generation of said scan lines;
    G. deriving a computation of the velocity determined by the pulse displacement and;
    H. providing a readout signal corresponding to said velocity.

2. A method as claimed in claim 1 wherein said array of scanned lines is a cartesian coordinate system.

3. A method as claimed in claim 1 wherein said velocity readout signal is digital.

4. A method as claimed in claim 1 wherein said velocity readout signal is analog.

5. Apparatus for measuring the velocity of an object such as a swinging golf club, the object having a particular color including:
    (a) a television camera adapted to be directed at said object, said camera having scanning circuits and video circuits responsive primarily to signals of images of said particular colored object, said video circuits including means for converting said signals into pulses;
    (b) means for producing synchronizing information signals connected to said camera;
    (c) processing means including fixed logic means interconnected to said camera and said synchronizing signal information producing means and adapted to receive said pulses and synchronizing information signals, said fixed logic means trnsforming said pulses and synchronizing information into an array of scanned lines in timed relation to said synchronizing signals, said fixed logic means computing the displacement and velocity of said pulses on said array of scanned lines from the pulse position and scanning interval and producing a readout signal corresponding to said velocity and;
    (d) a display unit interconnected to said processing means and receiving said readout velocity signal.

6. Apparatus as claimed in claim 5 wherein said television camera includes a closed circuit color television camera responsive to several colors and means provided to render such camera responsive only to said one color.

7. Apparatus as claimed in claim 5 wherein said display unit is an analog device.

8. Apparatus as claimed in claim 7 wherein said analog device is a strip chart recorder.

9. Apparatus as claimed in claim 5 wherein said display unit is a digital device.

10. Apparatus as claimed in claim 5 wherein said processing means include a microprocessor and associated peripheral hardware.

11. Apparatus as recited in claim 5 wherein said means for producing synchronizing information signals include a video synchronizing generator.

12. Apparatus for measuring the velocity of an object such as a swinging golf club in a field of view, the object having a particular color including:
    (a) Two television cameras adapted to be directed at said object, said cameras being disposed at right angles to each other, each said camera having scanning circuits and video circuits responsive primarily to signals of images of said particular colored object, said video circuits including means for converting signals into pulses;

(b) means for producing synchronizing information signals connected to said first and said second camera;

(c) processing means including fixed logic means interconnected to said first and said second camera and said synchronizing information producing means and adapted to receive said pulses and synchronizing information, said fixed logic means converting said pulses received from said first and second cameras and synchronizing information into a first and second array of scanned lines, said fixed logic means computing the displacement and velocity of said pulses on said first and second array of scanned lines and producing from the pulse position and scanning interval on said first and second array readout signals corresponding to the respective velocities, and;

(d) a display unit interconnected to said processing means and adapted to receive said readout signals.

13. Apparatus as claimed in claim 12 wherein said first and second camera include closed circuit color television cameras responsive to several colors and means provided to render such camera responsive to only one said color.

* * * * *